United States Patent [19]

Tsukada

[11] Patent Number: 5,582,486
[45] Date of Patent: Dec. 10, 1996

[54] OIL SUPPLYING STRUCTURE FOR LINEAR GUIDE APPARATUS

[75] Inventor: Toru Tsukada, Gunma, Japan

[73] Assignee: NSK Ltd, Tokyo, Japan

[21] Appl. No.: 542,829

[22] Filed: Oct. 13, 1995

[30] Foreign Application Priority Data

Oct. 14, 1994 [JP] Japan ................................ 6-249507

[51] Int. Cl.⁶ .................................................. F16C 33/10
[52] U.S. Cl. ................... 384/13; 384/43; 184/35
[58] Field of Search ............................... 184/35; 384/13, 384/43, 44, 45

[56] References Cited

U.S. PATENT DOCUMENTS

| | | | |
|---|---|---|---|
| 5,380,096 | 1/1995 | Tawaka | 384/13 |
| 5,380,097 | 1/1995 | Tawaka | 384/13 |
| 5,445,455 | 8/1995 | Holweg | 384/13 |

FOREIGN PATENT DOCUMENTS

| | | | |
|---|---|---|---|
| 221327 | 2/1990 | Japan | F16C 29/06 |
| 225719 | 2/1990 | Japan | F16C 29/06 |

*Primary Examiner*—Thomas E. Denion
*Attorney, Agent, or Firm*—Sughrue, Mion, Zinn, Macpeak & Seas

[57] ABSTRACT

In a linear guide apparatus, a uniform oil distributing valve is rotatably arranged on a supplying path of a fitting end surface of an end cap. The uniform oil distributing valve has a trifurcated path including one inflow path and two discharging paths and is such that the discharging paths are branched with respect to the inflow path at substantially the same angle. The uniform oil distributing valve is adjustable so that the discharging path communicates with a curved path out of both curved paths symmetrically arranged on the left and right sides and so that the other discharging path communicates with the other curved path by rotating the uniform oil distributing valve so as to correspond to an angle of inclination of the linear guide apparatus.

7 Claims, 6 Drawing Sheets

OIL SUPPLYING STRUCTURE FOR LINEAR GUIDE APPARATUS

BACKGROUND OF THE INVENTION

The present invention relates to oil supplying structures for rolling element rows symmetrically arranged on both left and right sides of a guide rail of a linear guide apparatus. More specifically, the present invention is directed to an oil supplying structure for a linear guide apparatus which can be so mounted as to correspond to the angle of inclination of the linear guide apparatus, and which is, therefore, suitable for supplying lubricating oil equally to the rolling element rows on both sides irrespective of the magnitude of the angle of inclination.

Figure 8:
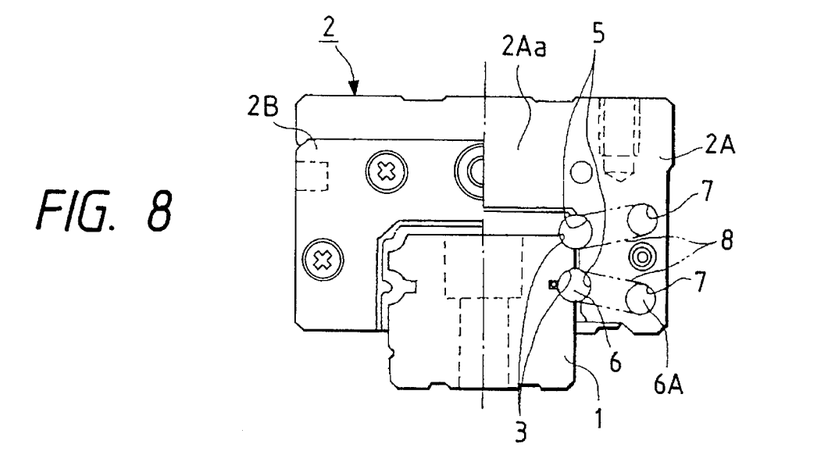
FIG. 8 is a front view showing a linear guide apparatus with a part thereof omitted.

As shown in FIG. 8, a linear guide apparatus generally includes: an elongated guide rail 1 having axially extending ball rolling grooves 3 symmetrically arranged on both side surfaces of the rail; and a slider 2 that mounts over the guide rail 1 so as to be movable relative to the guide rail in the axial direction and that has on inner side surfaces thereof ball rolling grooves 5 corresponding to the ball rolling grooves 3. A plurality of balls 6 are inserted into loaded ball rolling paths each of which is formed by both of the ball rolling groove 3 of the guide rail and the ball rolling groove 5 of the slider. These ball rows 6A circulate in endless circulating paths while rolling, each endless circulating path being formed by the loaded ball rolling path, a ball returning path 7 and curved paths 8. The slider 2 guided by the guide rail 1 is designed to move relative to the guide rail 1 in the axial direction through the rolling of the ball rows.

The ball rows 6A that repeat endless circulation during the operation of the linear guide apparatus are supplied with grease or oil. Generally, oil supplying is applied to a lubrication system by central oil supplying operation in automated lines and the like to which the grease is hard to supply. However, since oil is less viscous than grease and has fluidity, it is likely that insufficient oil lubrication results depending on positions where the oil is supplied in the operating aspect such as the linear guide apparatus is assembled with inclination.

Figure 9:
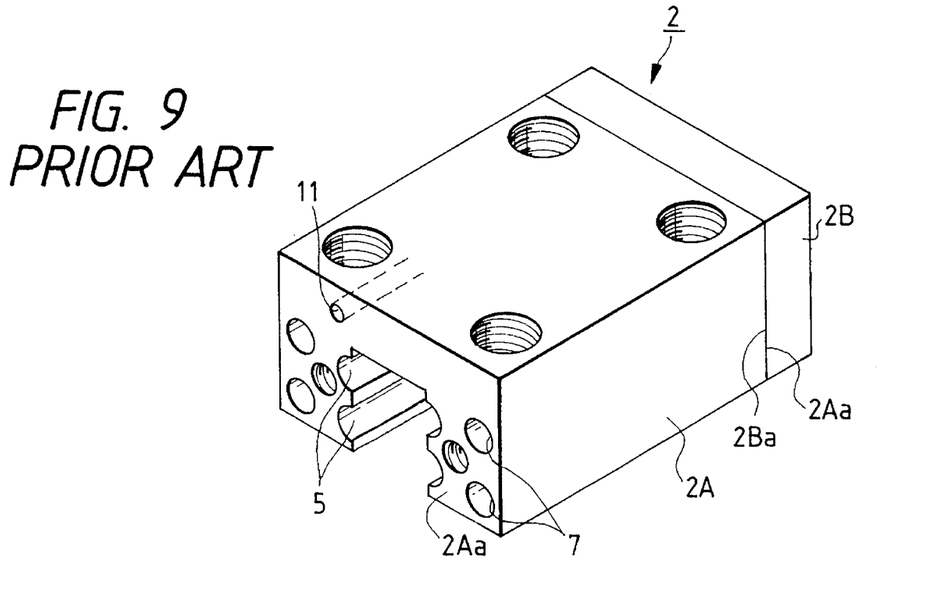
FIG. 9 is a perspective view showing the linear guide apparatus with one of the end caps of a slider of the linear guide apparatus omitted.
Figure 10:
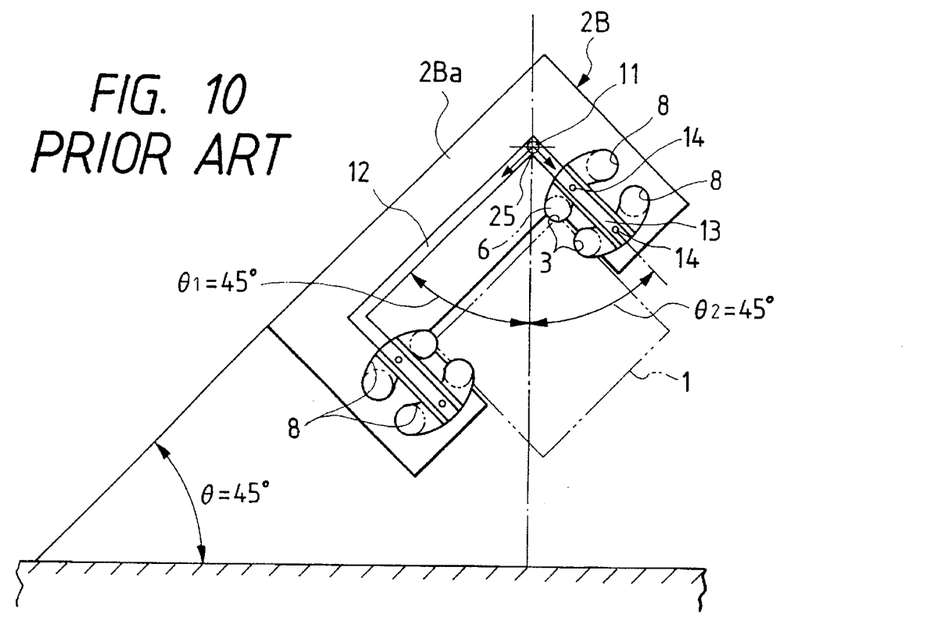
FIG. 10 is a view of a fitting end surface of an end cap showing an example of a conventional oil supplying structure for a linear guide apparatus.

For example, FIGS. 9 and 10 show an exemplary oil supplying structure for a conventional linear guide apparatus (conventional example 1). In the case of conventional example 1, an end cap 2B that is fitted to an end surface 2Aa of the main body 2A of the slider 2 mounting over the guide rail 1 has a square C-shaped branched oil passage 12 symmetrically arranged on a mounting end surface 2Ba thereof, the oil passage 12 communicating with an oil discharging hole 11 from a supplying port (not shown) on a side surface of the slider main body 2A. The oil flowing out into the branched oil passage 12 enters into a passage along the central portion of the axis of a semicylindrical return guide 13 that is fitted to the end surface 2Ba of the end cap 2B, then flows out into ball circulating curved paths 8 from supplying holes 14 in the wall surface of the return guide 13, so that the oil is supplied to the rolling balls 6. In this example as shown FIGS. 9 and 10, if the angle of inclination of the linear guide apparatus is 45° with respect to the horizontal plane, then the angles of inclination $\theta_1$, $\theta_2$ with respect to the vertical line at which the branched oil passage 12 is branched out of the oil discharging hole 11 become equally 45° ($\theta_1=\theta_2=45°$). Therefore, the oil flowing out of the oil discharging path 11 reaches the pair of curved paths 8 on each of the left and right sides while being uniformly distributed at a corner portion 12a of the square C-shaped branched oil passage 12.

Figure 11:
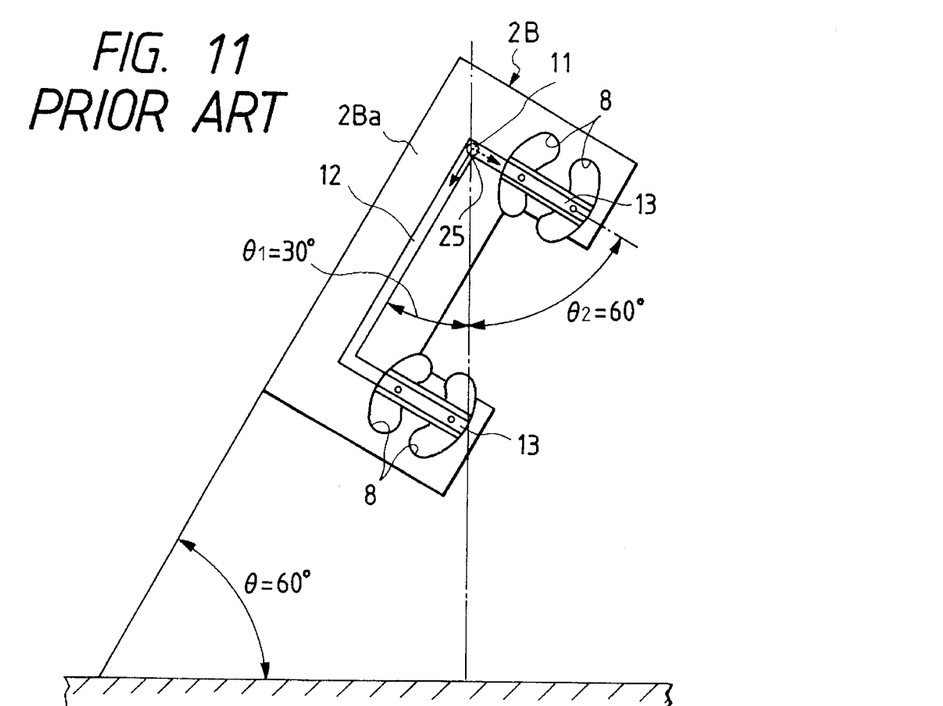
FIG. 11 is a diagram illustrative of problems addressed in the function of the example shown in FIG. 10.

However, as shown in FIG. 11, when the angle of inclination $\theta$ becomes 60°, then the respective angles of inclination $\theta_1$, $\theta_2$ of the branched oil passage 12 become different from each other with $\theta_1=30°$ and $\theta_2=60°$. As a result, a larger amount of lubricating oil flows into the branched oil passage 12 on the $\theta_1$ side whose inclination is steeper. On the other hand, few lubricating oil flows into the branched oil passage 12 on the $\theta_2$ side.

To overcome this problem, oil supplying structures are proposed in, e.g., Unexamined Japanese Utility Model Publication Nos. Hei. 2-21327 and Hei. 2-25719 (hereinafter referred to as "conventional example 2" and "conventional example 3", respectively).

Figure 12:
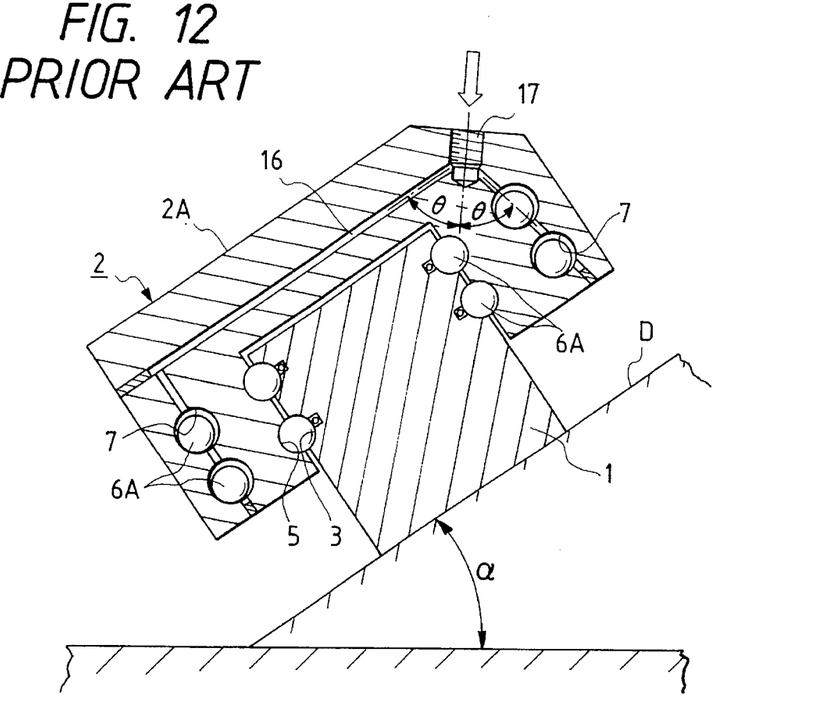
FIG. 12 is a sectional view showing another example of a conventional oil supplying structure for a linear guide apparatus.

As shown in FIG. 12, conventional example 2 is of a type which a linear guide apparatus is so mounted that two pairs of the ball rows 6A on both left and right sides of the guide rail 1 are inclined with one pair of ball rows being higher and the other pair of ball rows being lower. The conventional example 2 is characterized in that a branched oil path 16 having such an angle of inclination $\theta_1=\theta_2$ as to allow the oil to be equally distributed corresponding to the mounting angle of inclination $\alpha$ is arranged within the slider main body 2A, so that the lubricating oil can be distributed to both pairs of ball returning paths 7 within the slider main body 2A from the supplying port 17 at the same angle.

Figure 13:
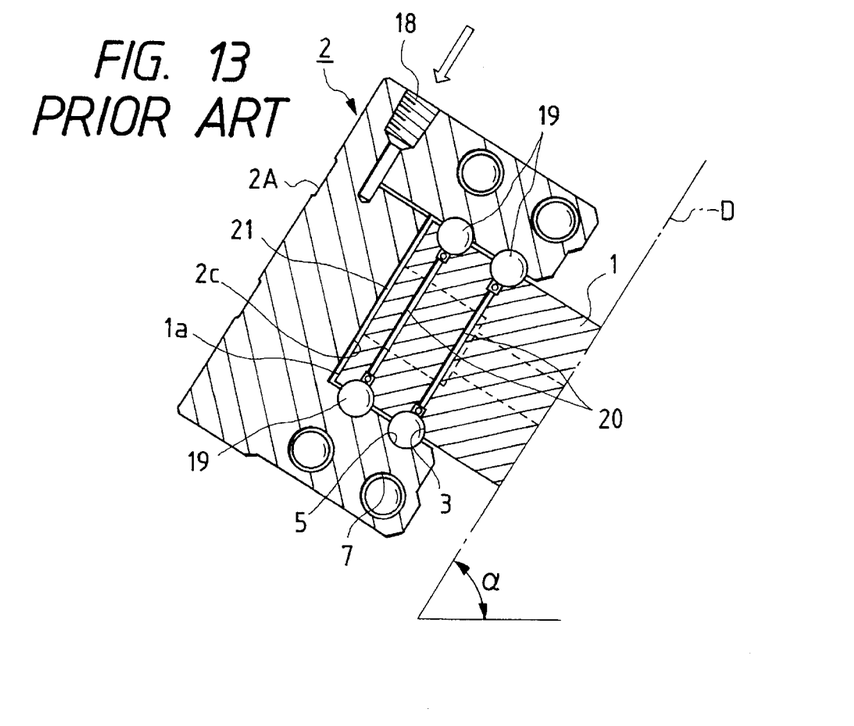
FIG. 13 is a sectional view showing still another example of a conventional oil supplying structure for a linear guide apparatus.

Further, as shown in FIG. 13, conventional example 3 is also of a type which a linear guide apparatus is so mounted as to be similarly inclined, and characterized in that not only a supplying port 18 is arranged perpendicularly on the upper outer side surface of the main body 2A of the slider 2 to supply a pair of upper ball rows 19, but also the ball rolling grooves 3 symmetrically arranged on the guide rail 1 are communicated with each other through connecting oil paths 20.

The conventional example 2 is designed to uniformly distribute the oil to both pairs of ball returning paths 7 symmetrically arranged on the left and right sides within the slider main body 2A by arranging the uniformly branched oil path 16 previously corresponding to the mounting angle of inclination $\alpha$ of the linear guide apparatus. However, in fact, it is extremely laborious and time-consuming to machine the branched oil path 16 within the slider main body 2A so that the oil path 16 is branched at the angles of inclination $\theta_1=\theta_2$ corresponding to the angle of inclination $\alpha$ of the linear guide apparatus.

On the other hand, the conventional example 3 is designed to cause the oil supplied to the pair of upper ball rows 19 of the obliquely mounted linear guide apparatus to flow into the pair of lower ball rows 19 through the connecting oil paths 20. However, in fact, if the angle of inclination $\alpha$ of the linear guide apparatus exceeds 45°, then most of the oil flows towards the pair of lower ball rows 19 via a clearance 21 between the upper surface 1a of the side rail 1 and the inner surface 2c of the slider 2 confronting the upper surface 1a. There causes a problem which the oil can hardly flow into the pair of upper ball rows 19.

Further, if the angle of inclination $\alpha$ is equal to or less than 45°, then the oil flows through the pair of upper ball rows 19 and then to the pair of lower balls rows 19 through the connecting oil paths 20. However, to arrange a plurality of connecting oil paths 20 along the elongated guide rail 1 raises the cost of manufacture. If, on the other hand, only one connecting oil path 20 is arranged, it is difficult to select a proper supplying timing.

SUMMARY OF THE INVENTION

The present invention has been made in view of the conventional problems. The object of the invention is, therefore, to provide an oil supplying structure for a linear guide apparatus capable of supplying oil smoothly in the ball rows even if the angle of inclination α of the linear guide apparatus is set to an arbitrary value.

To achieve the above object, the present invention is applied to an oil supplying structure for a linear guide apparatus, which includes: an elongated guide rail having axially extending rolling element rolling grooves symmetrically arranged on both side surfaces thereof; and a slider mounting over the guide rail so as to be movable relative to the guide rail in an axial direction and having rolling element rolling grooves corresponding to the rolling element rolling grooves of the guide rail on inner side surfaces thereof. The slider includes a slider main body and an end cap. The slider main body has not only the rolling element rolling grooves on the inner side surfaces thereof but also rolling element returning paths on the thick-walled portions of both sleeve portions, each rolling element returning path being constructed of an axially extending through hole extending in parallel with the corresponding rolling element rolling groove. The end cap is fitted to the slider main body. The end cap no only has semi-ringlike curved paths symmetrically arranged on both left and right sides of a fitting end surface on the back, each curved path serving to communicate the rolling element returning path with the corresponding rolling element rolling groove, but also has a supplying path communicating with the curved paths. The linear guide apparatus has endless circulating paths symmetrically formed on both left and right sides by loaded rolling element rolling paths and the rolling element returning paths, respectively, each loaded rolling element rolling path being formed by the rolling element rolling groove of the guide rail and the rolling element rolling groove of the slider. The linear guide apparatus also has rolling element rows, the rolling elements being constructed of a plurality of rolling elements being inserted into the endless circulating paths so as to be rollable therein. Further, the linear guide apparatus is mounted so that both rolling element rows symmetrically arranged on the left and right sides are inclined so as to have a difference in height therebetween. In such a linear guide apparatus, a rotatable uniform oil distributing valve is arranged at the supplying path on the fitting end surface of the end cap, the uniform oil distributing valve having a trifurcated path including a single inflow path and two discharging paths, the discharging paths being bifurcated substantially at the same angle with respect to the inflow path; and the uniform oil distributing valve being adjusted while rotated so as to correspond to the angle of inclination of the linear guide apparatus so that the discharging path communicates with one of both curved paths symmetrically arranged on the left and right sides and so that the other discharging path communicates with the other curved path.

The uniform oil distributing valve is fixed while being so rotated as to correspond to the angle of inclination of the obliquely mounted linear guide apparatus. Accordingly, the discharging paths of the trifurcated path are mounted so as to communicate with both curved paths symmetrically arranged on the left and right sides, respectively.

The oil supplied to the supplying port arranged in the slider flows into the inflow path of the uniform oil distributing valve to be distributed uniformly into the two discharging paths that are branched obliquely downward at substantially the same angle. The oil is, therefore, supplied to the rolling element returning path located on the upper sleeve portion of the end cap from one of the discharging paths. Further, the oil from the other discharging path is supplied to the rolling element returning path on the lower sleeve portion of the end cap. Such oil adheres to the rolling elements within the rolling element returning paths and is introduced into the rolling element rolling grooves together with the rolling elements that are moving while rolling via the rolling element returning paths. The rolling element rows within the rolling element rolling grooves on both left end right sides, one rolling element row being higher and the other rolling element row being lower, can be lubricated uniformly.

DETAILED DESCRIPTION OF THE PREFERRED EMBODIMENTS

Embodiments of the present invention will now be described with reference to the accompanying drawings.

FIGS. 1 to 4 show a first embodiment of the present invention. The same or like parts and components as those of the conventional examples are denoted as the same reference numerals. A guide rail 1 is square in section and has a pair of rolling groove rows 3 for rolling elements (hereinafter referred to as "the balls") formed symmetrically on each of both left and right outer side surfaces in parallel with each other. The guide rail 1 is placed on a base D that is inclined at an angle of inclination α. A slider 2, which is square C-shaped in section, includes a slider main body 2A and end caps 2B that are fitted to the slider main body 2A so as to contact both end surfaces 2Aa of the slider main body 2A with the end caps 2B.

Figure 1:
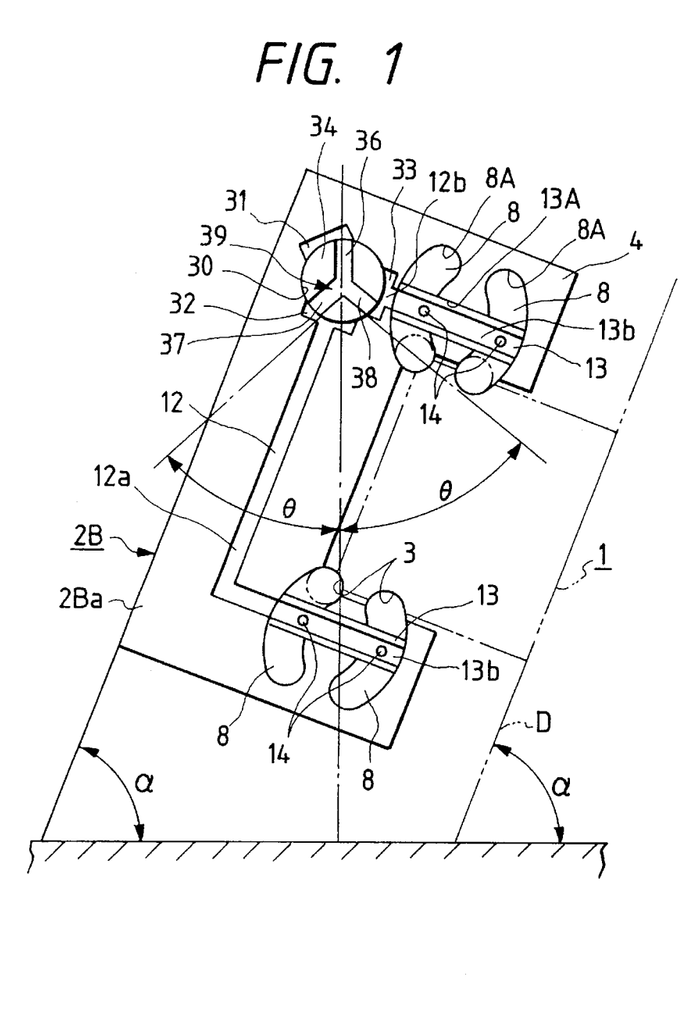
FIG. 1 is a view of a fitting end surface of an end cap showing an oil supplying structure for a linear guide apparatus, which is a first embodiment of the present invention.
Figure 2:
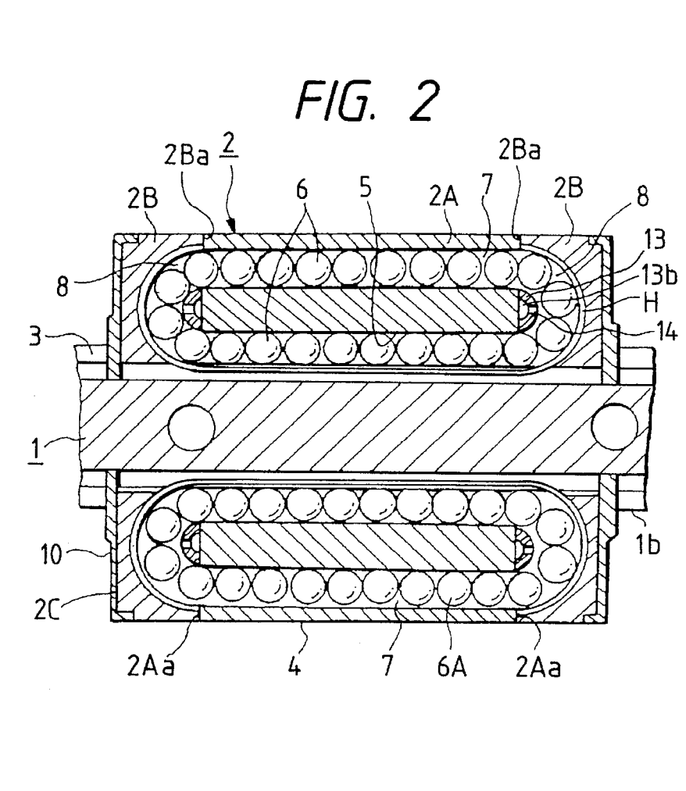
FIG. 2 is a sectional view of rolling element circulating paths of the linear guide apparatus.

The slider main body 2A is square C-shaped in section. A ball rolling groove 5 is formed in a semicircular sectional shape at a position confronting the ball rolling groove 3 of the guide rail 1 in the inner side surface of a sleeve portion 4 of the slider main body 2A. A straight ball returning path 7 that extends in parallel with the ball rolling groove 5 is formed on the thick-walled portion of the sleeve portion 4. On the other hand, a pair of semicircular recessed portions 8A, upper and lower, are symmetrically formed in each of both left and right sleeve portions 4 on a fitting end surface 2Ba with respect to the slider main body 2A in the end cap 2B. The upper and lower recessed portions 8A connect each other through a semicylindrical recessed groove 13A arranged at the center of the semicircle of the end surface 2Ba. By fitting a semicylindrical return guide 13 with the recessed groove 13A, semi-ringlike curved paths 8 communicating the ball rolling groove 5 with the ball returning path 7 of the slider main body 2A are formed. A plurality of balls 6 are rollingly inserted into each ball circulating path formed by a loaded ball rolling groove, the ball returning path 7, and the curved paths 8, the loaded ball rolling groove being formed by the ball rolling groove 3 of the guide rail and the ball rolling groove 5 of the slider confronting the ball rolling groove 3. The ball rows 6A are symmetrical with the central axis of the slider 2.

Further, a recessed groove 13b in the central portion of the axis of the semicylindrical return guide 13 is designed as an oil passage. Supplying holes 14 communicating the oil passage 13b with the respective curved paths 8 are formed in the wall surface of the return guide 13.

A square C-shaped branched oil passage 12 is also arranged in the end surface 2Ba of the end cap 2B. The oil passage 12 serves as a supplying path communicating with an oil discharging hole 11 from a supplying port (not shown) in a side surface of the slider main body 2A. The end portions of the branched oil passage communicate with the oil passages 13b of the return guides 13, respectively. Further, according to the first embodiment, a circular recessed portion 30 and three oil reservoir pits 31, 32, 33 are formed at the upper corner out of the two corners of the branched oil passage 12, the oil reservoir pits 31, 32, 33 projecting outward from the circular recessed portion 30. The respective oil reservoir pits 31, 32, 33 are preferably formed as wide as possible by notching the outer circumferential surface of the circular recessed portion 30 as long as possible in the circumferential direction. As a result of such design, the oil reservoir pits can accommodate a wide range of changes in the angle of inclination α of the linear guide apparatus.

Figure 3:
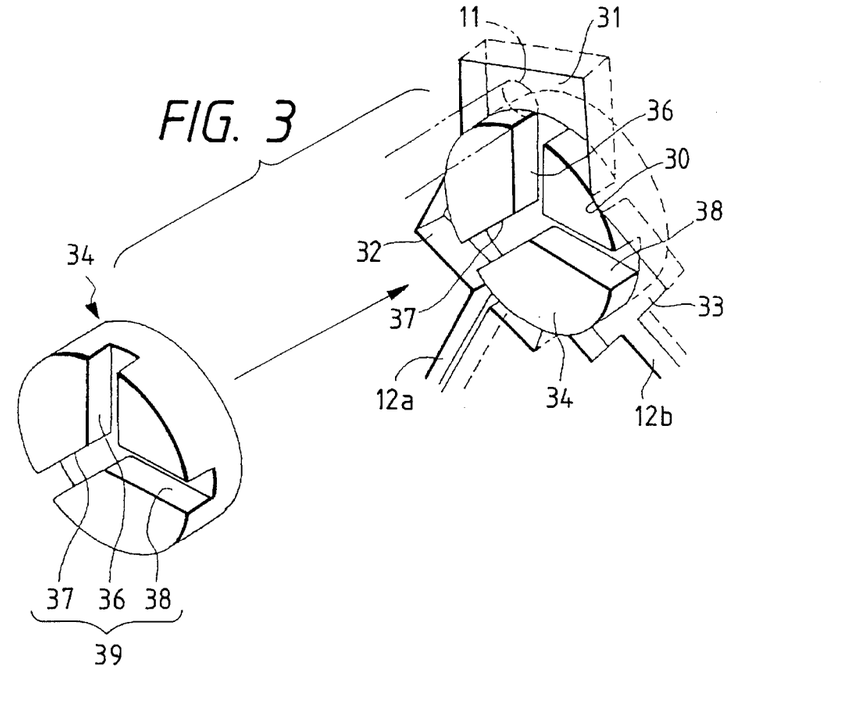
FIG. 3 is an enlarged exploded perspective view of assembling an oil distributing valve shown in FIG. 1.

A uniform oil distributing valve 34 that is cylindrical is rotatably fitted into the circular recessed portion 30. The uniform oil distributing valve 34 has a trifurcated path 39 that includes one inflow path 36 and two discharging paths 37, 38. These discharging paths 37, 38 bifurcate at angles of inclination θ that are equal with respect to the inflow path 36. The magnitude of this angle of inclination θ is appropriately selected in consideration of such factors as a relative position of the distributing pipe to the slider 2, a relationship with respect to the magnitude of the angle of inclination α of the linear guide apparatus, and the like.

The uniform oil distributing valve 34 is so mounted as to correspond to the angle of inclination α of the linear guide apparatus that has been set previously. That is, not only the inflow path 36 communicates with the oil reservoir pit 31 which directly connects the oil discharging hole 11 of the slider main body 2A, but also the discharging path 37 communicates with the oil reservoir pit 32 which directly connects the branched oil passage 12a to the lower curved paths 8 through the oil passage 13b of the return guide 13. At the same time, the other discharging path 38 communicates with the oil reservoir pit 33 that directly connects the branched oil passage 12b to the upper curved paths 8 through the oil passage 13b of the return guide 13. The operation of adjusting communication between the respective oil reservoir pits 31, 32, 33 and the trifurcated path 39 is performed by rotating the uniform oil distributing valve 34. The thus positioned uniform oil distributing valve 34 is fixed to the corresponding end cap 2B by fusion or by an adhesive.

The slider 2 is so assembled that the end cap 2B mounting the uniform oil distributing valve 34 is fitted to the slider main body 2A.

Next, the operation of the first embodiment will be described.

The slider 2 is moved in the axial direction of the guide rail 1. Then, the balls 6 are moved in the same direction at a speed lower than the moving speed of the slider 2 while rolling in the loaded ball rolling path formed by the ball rolling groove 3 of the guide rail and the ball rolling groove 5 of the slider. Accordingly, the balls 6 repeat such a circulation as to make a U-turn along the curved path 8 to move into the ball returning path 7 after having reached the end cap 2B on one end of the slider, and then to make another U-turn along the curved path 8 of the end cap 2B on the other end to move into the loaded ball rolling path. Hence, the movement of the slider 2 is very light and smooth.

Figure 4:
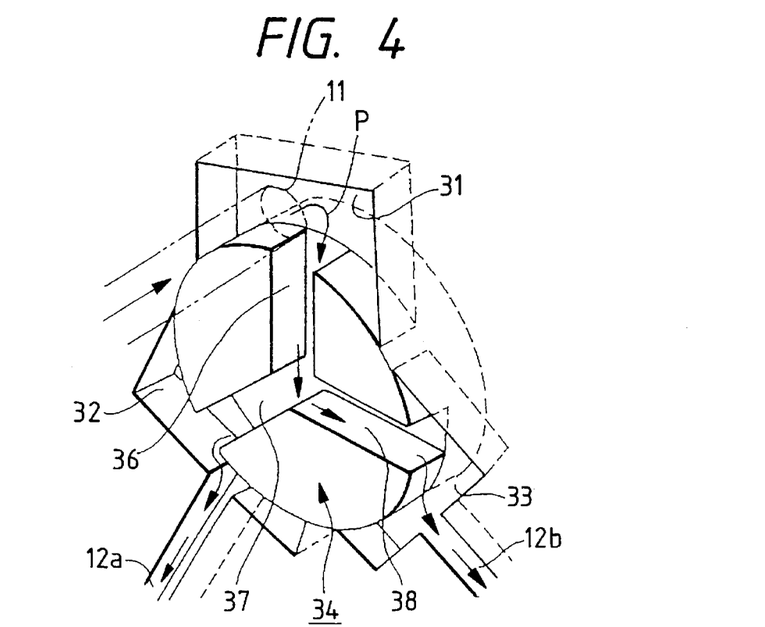
FIG. 4 is a diagram illustrative of the operation of the valve shown in FIG. 3.

At the time of this operation, lubricating oil which is supplied from a central oil supplying device (not shown) is introduced into the oil reservoir pit 31 of the end cap 2B from the oil discharging hole 11 of the slider main body 2A as shown by an arrow P in FIG. 4. The introduced oil enters into the inflow path 36 of the uniform oil distributing valve 34. The entered oil is distributed uniformly into the discharging paths 37, 38 that are bifurcated at the same angle of inclination θ, so that the lubricating oil flows down into the oil reservoir pits 32, 33 in uniform amounts. The oil that has entered into the oil reservoir pit 32 reaches the oil passage 13b of the return guide 13 which communicates with the lower curved paths 8 while flowing down along the branched oil passage 12a. Then the oil is supplied into the lower curved paths 8 from the supplying holes 14 On the other hand, the oil that has entered into the oil reservoir pit 33 reaches the oil passage 13b of the return guide 13 which communicates with the upper curved paths 8 while flowing down along the branched oil passage 12b. Then the oil is supplied into the upper curved paths 8 from the oil supplying holes 14. The oil that has been supplied to the curved paths 8 serves as a lubricant by adhering to the rolling and moving balls 6 while being guided along each loaded ball rolling path formed by the ball rolling grooves 3 and 5 via the corresponding ball returning path 7.

According to the first embodiment, the oil can be supplied uniformly to both pairs of ball row 6A, one pair being higher and the other being lower, on both sides of the slider 2.

Figure 5:
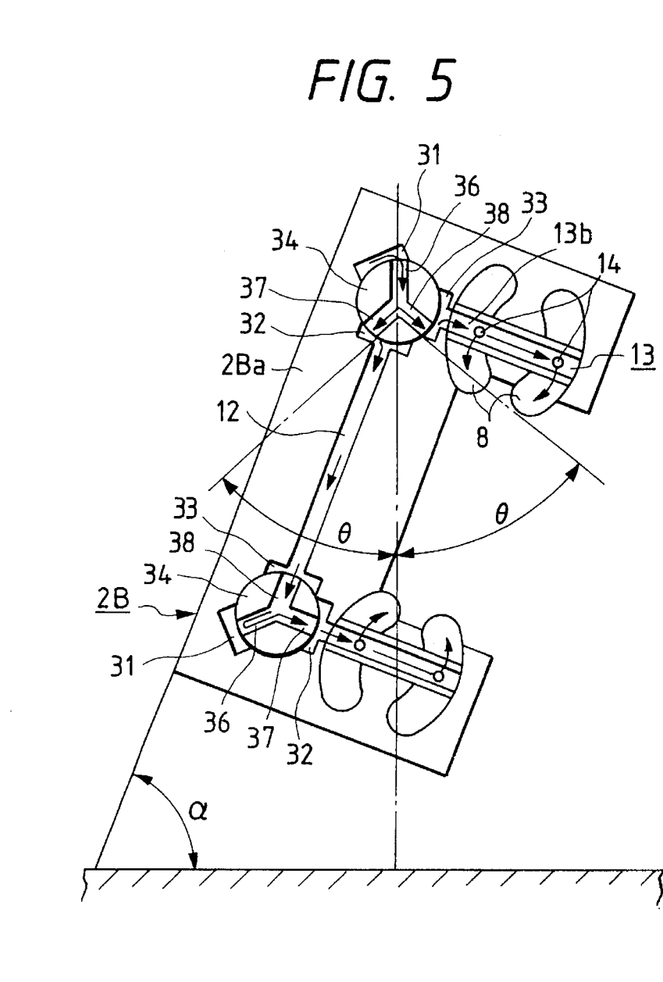
FIG. 5 is a view of a fitting end surface of an end cap showing an oil supplying structure for a linear guide apparatus, which is a second embodiment of the present invention.

A second embodiment of the present invention is shown in FIG. 5.

The second embodiment is distinguished from the first embodiment in that the uniform oil distributing valves 34 are arranged at both corners in the square C-shaped branched oil passage 12. In this case, although the lower uniform oil distributing valve 34 functions merely as an oil passage, not as a uniformly distributing valve, the lower uniform oil distributing valve 34 does function as a uniformly distributing valve if the lower uniform oil distributing valve 34 relocates the place of the upper uniform oil distributing valve 34 due to changing the angle of inclination α of the linear guide apparatus. Therefore, the second embodiment provides the advantage of accommodating a wider range of needs depending on the operating aspect of the linear guide apparatus. Further, the end cap 2B of the second embodiment is fittable to each of both ends of the slider main body 2A of the linear guide apparatus. Therefore, the interchageability of parts is increased, which is another advantage.

Figure 6:
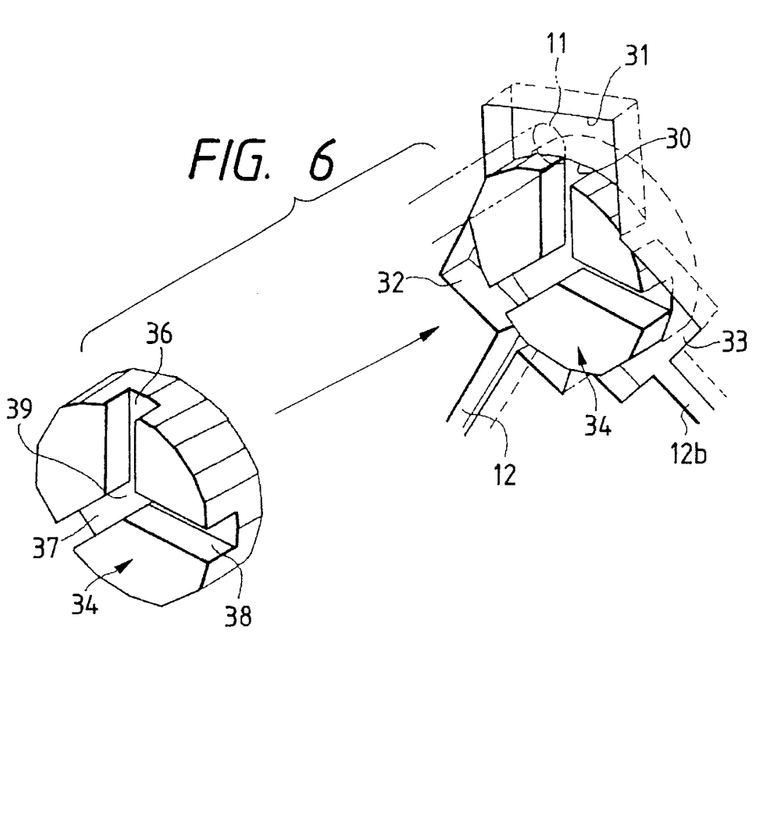
FIG. 6 is an enlarged exploded perspective view of assembling an oil distributing valve in a third embodiment of the invention.

A third embodiment of the present invention is shown in FIG. 6.

The third embodiment is characterized as forming the outer circumference of the uniform oil distributing valve 34 into a polygon inscribing the inner circumferential surface of the circular recessed portion 30. Since the third embodiment is free from defects such as rotational displacement of the uniform oil distributing valve 34, it is not necessary to fuse or attach the uniform oil distributing valve 34 to the end cap 2B; i.e., the uniform oil distributing valve 34 can merely be fitted into the end cap 2B.

Figure 7:
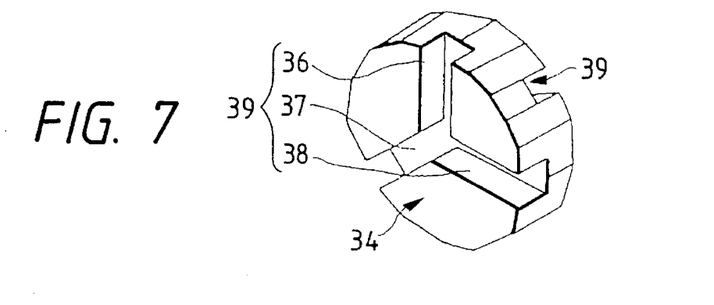
FIG. 7 is a perspective view of an oil distributing valve in a fourth embodiment of the present invention.

A fourth embodiment of the present invention is shown in FIG. 7.

The fourth embodiment is characterized as forming the trifurcated paths 39 on both outer end surfaces of the polygonal uniform oil distributing valve 34 so as to be out of phase with each other between the outer end surfaces. Not only the polygonal uniform oil distributing valve 34 but also the cylindrical uniform oil distributing valve 34 shown as the first embodiment can, of course, similarly have the trifurcated paths 39 on both outer end surfaces thereof.

The fourth embodiment provides the advantage of not only using both surfaces as flow paths but also improving adjustment capability with repeat to changes in the angle of inclination α of the linear guide apparatus.

While the examples in which the balls are employed as the rolling elements have been described in the aforementioned respective embodiments, the present invention can similarly be applied to an example in which rollers are employed as the rolling elements.

Further, while the examples in which a plurality of ball rows are arranged have been described, the present invention can similarly be applied to an example in which a single ball row is arranged.

As described in the foregoing, the present invention is characterized as arranging a uniform oil distributing valve at a supplying path on an end surface of an end cap of a slider in a linear guide apparatus so that the flow path positions can be adjusted by rotating the uniform oil distributing valve, the uniform oil distributing valve having a trifurcated path including an inflow path and two discharging paths and being such that the discharging paths are bifurcated at substantially the same angle with respect to the inflow path. Therefore, even if the linear guide apparatus is installed while being inclined at an arbitrary angle, the lubricating oil can be distributed uniformly into the symmetrical rolling element circulating paths on both left and right sides from the respective discharging paths so as to correspond to the angle of inclination of the linear guide apparatus. As a result, the lubricating oil can be supplied to the rolling element circulating paths on both left and right sides stably at all times, which in turn provides the advantage of ensuring the long life of the apparatus.

In addition, the uniform oil distributing valve of the present invention is easy to manufacture by synthetic resin molding similarly to the end caps, which in turn provides the advantage of manufacturing uniform oil distributing valves inexpensively.

What is claimed is:

1. A linear guide apparatus mounted at a predetermined angle of inclination, comprising:

a guide rail including first rolling grooves extending in an axial direction of the guide rail and symmetrically arranged on both side surfaces thereof;

a slider mounting over the guide rail movably relative to the guide rail in the axial direction, and including a slider main body having second rolling grooves corresponding to the first rolling grooves on inner side surfaces of the slider and returning paths on sleeve portions of the slider main body, the returning paths comprising through holes axially extending in parallel with the second rolling grooves, the slider further including an end cap with an fitting end surface which is fitted to the slider main body, the end cap having semi-ringlike curved paths symmetrically arranged on both sides of the fitting end surface and a supplying path communicating with the curved paths each of which serves to communicate between the returning paths and the second rolling grooves, respectively, a pair of the first rolling grooves and the second rolling grooves symmetrically comprising endless circulating paths with the returning paths and the curved paths, respectively;

a pair of rolling element rows symmetrically formed of a plurality of rolling elements which are rollingly inserted into the endless circulating paths, the rolling element rows being so inclined as to cause a difference in height between the rolling element rows;

an oil distributing valve being arranged at the supplying path on the fitting end surface and rotatably adjusted to the angle of inclination, and comprising a trifurcated path including a single inflow path and two discharging paths, the discharging paths being bifurcated substantially at the same angle with respect to the inflow path, the discharging paths communicating with the respective curved paths.

2. The linear guide apparatus of claim 1, wherein oil distributing valves are arranged on both the sides of the fitting end surface, respectively.

3. The linear guide apparatus of claim 1, wherein the end cap includes a recessed portion into which the oil distributing valve is fitted, and the oil distributing valve includes an outer circumference which is formed into a cylindrical shape inscribing an inner circumferential surface of the recessed portion.

4. The linear guide apparatus of claim 1, wherein the end cap includes a recessed portion into which the oil distributing valve is fitted, and the oil distributing valve includes an outer circumference which is formed into a polygon inscribing an inner circumferential surface of the recessed portion.

5. The linear guide apparatus of claim 3, wherein the oil distributing valve includes trifurcated paths on outer end surfaces of the oil distributing valve, respectively, the trifurcated paths being out of phase with each other between the outer end surfaces.

6. The linear guide apparatus of claim 4, wherein the oil distributing valve includes trifurcated paths on outer end surfaces of the oil distributing valve, respectively, the trifurcated paths being out of phase With each other between the outer end surfaces.

7. The linear guide apparatus of claim 1, wherein the end cap includes a recessed portion into which the oil distributing valve is fitted, the recessed portion having oil reservoirs projecting outwardly from an outer circumferential surface of the recessed portion, the oil reservoirs communicating with the inflow path and the discharging paths, respectively.

* * * * *